United States Patent [19]

Rothfield

[11] Patent Number: 5,428,776
[45] Date of Patent: Jun. 27, 1995

[54] SYSTEM FOR COMPOSING A GRAPHICAL INTERFACE TO A RELATIONAL DATABASE WHICH DISPLAYS A NETWORK OF QUERY AND SOURCE ICONS

[75] Inventor: Evan M. Rothfield, Brigton, Mass.

[73] Assignee: Wang Laboratories, Inc., Lowell, Mass.

[21] Appl. No.: 175,161

[22] Filed: Dec. 22, 1993

Related U.S. Application Data

[63] Continuation of Ser. No. 667,859, Mar. 12, 1991, abandoned.

[51] Int. Cl.$^6$ .............................................. G06F 17/30
[52] U.S. Cl. ................................... 395/600; 355/155; 364/DIG. 1; 364/282.1; 364/282.3
[58] Field of Search ......................... 395/155, 600, 200

[56] References Cited

U.S. PATENT DOCUMENTS

| | | | |
|---|---|---|---|
| 4,506,326 | 3/1985 | Shaw et al. | 395/700 |
| 5,202,985 | 4/1993 | Goyal | 395/600 |
| 5,212,771 | 5/1993 | Gane et al. | 395/160 |
| 5,212,787 | 5/1993 | Baker et al. | 395/600 |
| 5,228,123 | 7/1993 | Heckel | 395/155 |
| 5,297,249 | 3/1994 | Bernstein et al. | 395/156 |
| 5,305,434 | 4/1994 | Ballard et al. | 395/155 |

OTHER PUBLICATIONS

Chang, "A Visual Language Compiler for Information Retrieval by Visual Reasoning", IEEE Transactions on Software Engineering, vol. 16, No. 10, Oct. 1990, pp. 1136–1149.

Tsuda et al., "Iconic Browser: An Iconic Retrieval System for Object–Oriented Databases", 1989 IEEE Workshop on Visual Languages, 4–6 Oct. 1989, Rome, Italy, pp. 130–137, ISBN 0 8186 2002 1.

Primary Examiner—Thomas G. Black
Assistant Examiner—Wayne Amsbury
Attorney, Agent, or Firm—Kenneth L. Milik

[57] ABSTRACT

A Graphical Query Front End system for Querying a relational database displays the elements of a Query in graphical form. The graphical query consists of tables, shown as nodes on a display, used as input (i.e. connected) to operator nodes, which produce output tables by modifying the inputs based on information provided by the user. There are several operators, each of which represents a different piece of defining a query, e.g. selecting columns or selecting rows. These operator nodes may then be used as inputs to operator nodes which modify their inputs to produce output tables, and so on until the desired result is achieved.

23 Claims, 14 Drawing Sheets

FIG. 5

Join Criteria Definition

Employees~4b (T1) — 12-2a
- EMPLOYEE_ID
- LAST_NAME
- FIRST_NAME
- PHONE_NUMBER
- JOB_TITLE dept salaries~10 (T2) — 12-2b
- REPORTING_DEPT_NUMBER
- AVGSALARY Ops, Fns: — 12-2d
- +
- −
- *
- /
- %

Text: — 12-2e
- <space>
- <return>
- and
- or
- not

Define join predicate: — 12-2c
T1.REPORTING_DEPT_NUMBER=T2.REPORTING_DEPT_NUMBER Use Relationship... — 12-2f

[ Verify ]   [ Save ]   [ Cancel ]

Filter Criteria Definition

Fields of... JOIN126-RES 52 — 14-2a

LAST_NAME
JOB_TITLE
SALARY
REPORTING_DEPT_NUMBER
AVGSALARY

Ops, Fns: — 14-2f
+
−
×

Text: — 14-2g
<space>
<return>
and

Pick Value... — 14-2e

Select all fields — 14-2c

Deselect all fields — 14-2d

Define filter predicate: — 14-2b

SALARY > AVGSALARY

Verify    Save    Cancel

FIG. 10

Show SQL

SQL for... SORT143-RES 34

```
SELECT LAST_NAME,JOB_TITLE,AVG SALARY,
       T2.REPORTING_DEPT_NUMBER AS DEPT_NUM,JOB_TITLE,
       SALARY
FROM MODQE2..Employees AS T1
     (SELECT REPORTING_DEPT_NUMBER,AVG(SALARY)
        AS AVGSALARY
      FROM MODQE2..Employees
      GROUP BY REPORTING_DEPT_NUMBER
     ) AS T2
WHERE (T1.REPORTING_DEPT_NUMBER =
       T2.REPORTING_DEPT_NUMBER) AND (SALARY>
       AVGSALARY)
ORDER BY LAST_NAME
```

OK    Save to File...

34-2
34-2a

Results for...  SORT143-RES

| LAST NAME | JOB TITLE | AVGSALARY | DEPT NUM | SALARY |
|---|---|---|---|---|
| ALLISON | SALES REP | 43500.00 | 50 | 75000.00 |
| COLE | SALES REP | 32957.00 | 10 | 48000.00 |
| ELLIOTT | SALES REP | 39668.75 | 20 | 42500.00 |
| ENMAN | MANAGER | 32350.00 | 30 | 50000.00 |
| FALZARANO | MANAGER | 39668.75 | 20 | 56700.00 |
| HUBER | MANAGER | 36111.00 | 40 | 45750.00 |
| KAPLAN | MANAGER | 25720.00 | 60 | 27000.00 |
| MATHEW | SALES REP | 43500.00 | 50 | 74000.00 |
| MORROW | SALES REP | 31428.00 | 70 | 41620.00 |
| MORSE | COPYWRITER | 32957.14 | 10 | 35600.00 |
| MOSTOV | SALES REP | 25720.00 | 60 | 30000.00 |
| O'ROURKE | SALES REP | 25720.00 | 60 | 32000.00 |
| PICONE | SALES REP | 43500.00 | 50 | 59500.00 |
| SHENNAN | MANAGER | 43500.00 | 50 | 45000.00 |
| SHUGRUE | SALES REP | 32957.14 | 10 | 38100.00 |
| SMITHWICK | SALES REP | 32350.00 | 30 | 44400.00 |

OK

SYSTEM FOR COMPOSING A GRAPHICAL INTERFACE TO A RELATIONAL DATABASE WHICH DISPLAYS A NETWORK OF QUERY AND SOURCE ICONS

This application is a continuation of application Ser. No. 07/667,859, filed Mar. 12, 1991, now abandoned.

BACKGROUND OF THE INVENTION

1. Scope of the Invention

This invention relates to database management systems, and more particularly to graphically querying relational database systems.

2. Description of the Prior Art

All database management systems store and manipulate information. The relational approach to database management, proposed in 1970 by Dr. E. F. Codd at the IBM Research Laboratory in San Jose, Calif. and developed during the following decade by many universities and laboratories, represents all information as "tables." A "database" is a collection of tables. Each table has rows and columns. Each row (horizontal) describes one occurrence of an entity such as a person, a company, a sale or some other thing. Each column (vertical) describes one characteristic of the entity such as a person's name, a company address or a date. Furthermore, each row of a table is uniquely identified by values in one or more of its columns.

All database management systems have some mechanism for getting at the information stored in a database. Such a mechanism involves specifying data retrieval operations, often called "queries," to search the database and then fetch and display the requested information.

There are standard means of formulating queries for relational systems, such as the Structured Query Language (SQL) and Query-by-Example. There are even graphical solutions on the market. However, all of these methods have particular problems associated with them.

Today's standard, SQL, is typed in using English-like syntax. There are particular words or tokens that distinguish particular clauses to do different parts of the query, such as selecting the columns to keep in the result or selecting the rows to keep. One has to know the difficult syntax to be able to formulate the question using SQL. For something like Query-by-Example, there is not much syntax to learn, but the interface is one that must really be explored in depth before queries of any complexity can be developed.

Some companies have attempted to resolve the inadequacies of these methods by coming up with more graphical solutions. They tend to show graphical representations of entities such as tables, and then use connections to link them up and join the information together. They work well for simple queries but cannot be used when the questions get too involved—it is often assumed the more difficult queries can be handled using SQL. However, when SQL is used, queries of greater complexity may be formulated, but then ease of use is lost.

It should be noted that there is a body of related work in the academic literature dealing with graphical database design, semantic data modeling, and even graphical query languages. Typical examples of such work are those described in the following documents:

"A Graphical Data Base Design Aid Using The Entity-Relationship Model," by Chan and Lochovsky, published in the Proceedings, International Conference on Entity-Relationship Approach To System Analysis and Design, 1979, pp. 295–310.

"Graphical query languages for semantic database models" by Czejdo et. al., National computer conference, 1987, pp.617–623.

OBJECTS OF THE INVENTION

Accordingly, it is an object of the invention to have an improved relational database query system.

It is another object of the invention to have an improved graphical relational database query system.

It is yet another object of the invention to have an improved graphical relational database query system which retains and displays the history of the Query.

It is still another object of the invention to have an improved graphical relational database query system which displays the history of the Query on demand.

SUMMARY OF THE INVENTION

The above objects and advantages are achieved in a preferred embodiment of the present invention. According to the preferred embodiment, the Graphical Query Front End system displays the elements of a Query in graphical form.

The graphical query consists of tables, shown as nodes on a display, used as input (i.e. connected) to operator nodes, which produce output tables by modifying the inputs based on information provided by the user. There are several operators, each of which represents a different piece of defining a query, e.g. selecting columns or selecting rows. These operator nodes may then be used as inputs to operator nodes which modify their inputs to produce output tables, and so on until the desired result is achieved.

Each of these operator nodes may take as input one or two table or operator nodes, depending on the represented operation, and each produces one output table. Thus the graphical query appears to be an inverted tree, with the data flowing from the source tables down through the modifying operators to the "root" or final result. However, each of the table or operator nodes also represents a table, and therefore a query unto itself, the results of which are available at any time in the definition process. Also, while the graphical tree shows the user's process of achieving the query results, the same process is not necessarily used by the database management system to actually produce the results, thereby freeing the user from concerns about performance.

The invention consists of a "window" to display the graphical query, a palette containing the operators that may be included in the query, and menus which may be used to add tables to the query, edit the "criteria" associated with an operator (i.e. the information which describes how the operator modifies its input(s)), show the columns of a node, show the SQL translation of a node, and show the query results of a node.

DESCRIPTION OF THE DRAWINGS

FIG. 5 shows the Join Criteria Definition dialog box.

FIG. 6 shows the Filter Criteria Definition dialog box.

FIG. 10 shows the Show SQL dialog box.

DETAILED DESCRIPTION OF THE PREFERRED EMBODIMENT

Whereas the prior art relational Database Management Systems develop all of the conditions of the Query before entering it into the system, this invention introduces a step by step graphical approach. Each graphical step may be reviewed and modified during any stage of the development of the Query. Also, the details of the design are readily available at any time after the completion of the design.

The invention makes available several "operators" which are displayed graphically as icons, each representing a different part of the Query. No matter how complex the Query, breaking it up in small graphical steps simplifies the design, the usage and the maintenance.

Each of the operators takes as input one or two nodes (representing tables) and produces a single output table. The output table is determined by the criteria defined for the particular operator. Thus, while each operator is used to represent "a different part of the Query," the operators may be used more than once within the same Query.

Figure 1:
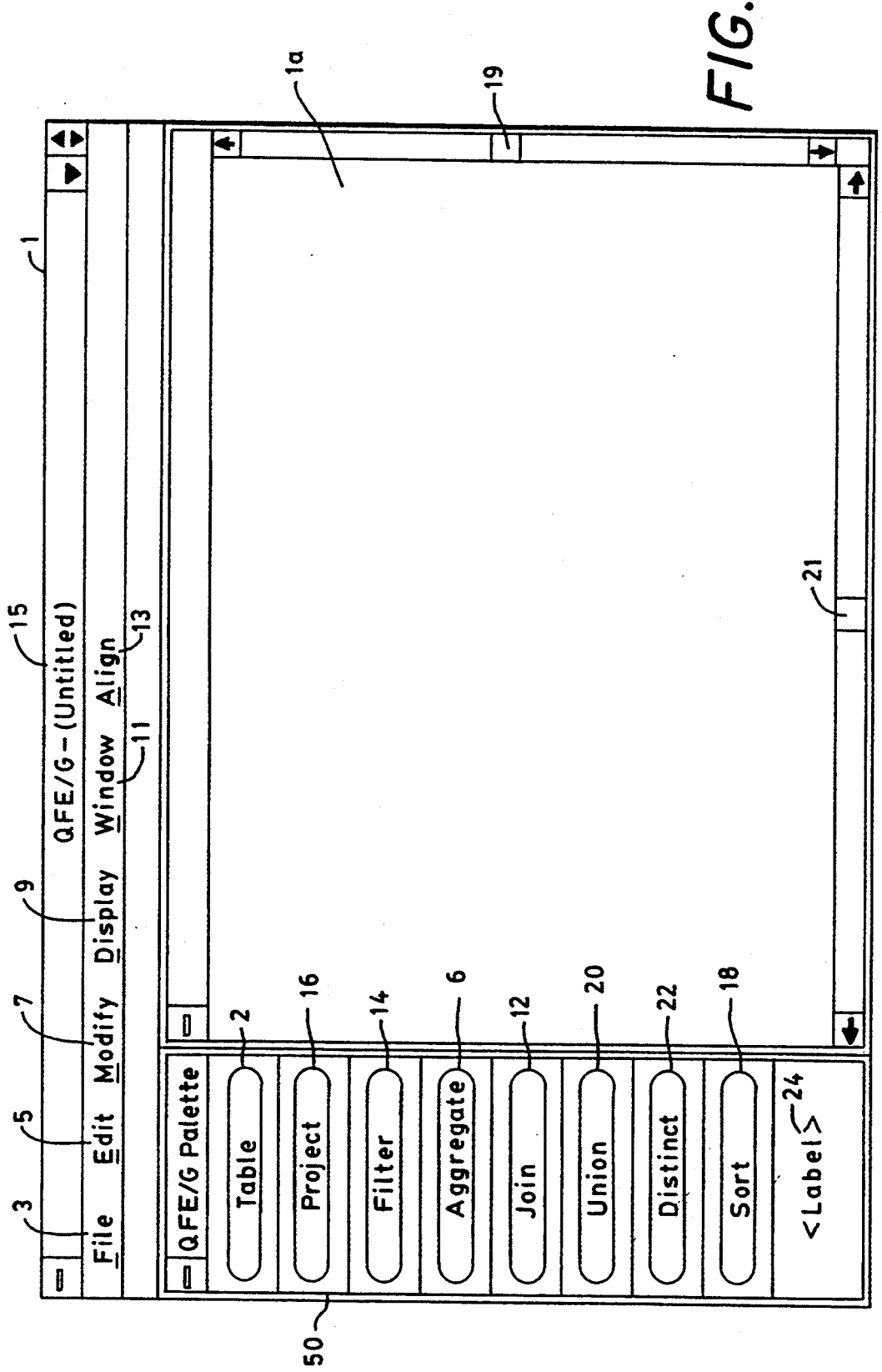
FIGS. 1, 1A and 1B show an untitled empty screen, the Modify menu, and the Add Related Table.

FIG. 1 shows an "empty" screen 1 depicting a Graphical Query Front End application prior to starting the development of the Query. The screen 1 includes an overall title bar 15 for displaying the name of the application (in this case QFE/G) and the current file. The file name is [Untitled], meaning there is no file associated with the current diagram.

A palette 50 includes a number of icons. A mouse (not shown) allows the user to control a cursor which appears over the screen. Any of the icons in the palette may be "copied into" a window 1a by clicking a button on the mouse while the cursor is positioned over the desired palette icon, then moving the cursor into the window 1a and clicking again when the cursor is at the position where the new icon should be placed.

After selecting a table icon 2, the user may then associate a table from the current database with it. No dialog example has been included for associating a table definition.

The project icon 16 is used to select columns from a table or add columns to a table via expressions. Also, columns may be reordered or renamed.

The filter icon 14 is used to select the rows of a table that meet a specified condition.

The aggregate icon 6 is used to produce aggregate values including sums, counts, average, maximum and minimum values from a table.

The Join icon 12 combines selected columns of two input tables in which a column of one table relates to a column of the other table.

The union icon 20 effectively combines the rows of two input tables.

The distinct icon 22 is used to retain unique rows in a result, i.e. duplicate rows are deleted.

A sort icon 18 is used to sort the rows in a table based upon columns in ascending or descending order.

Figure 2:
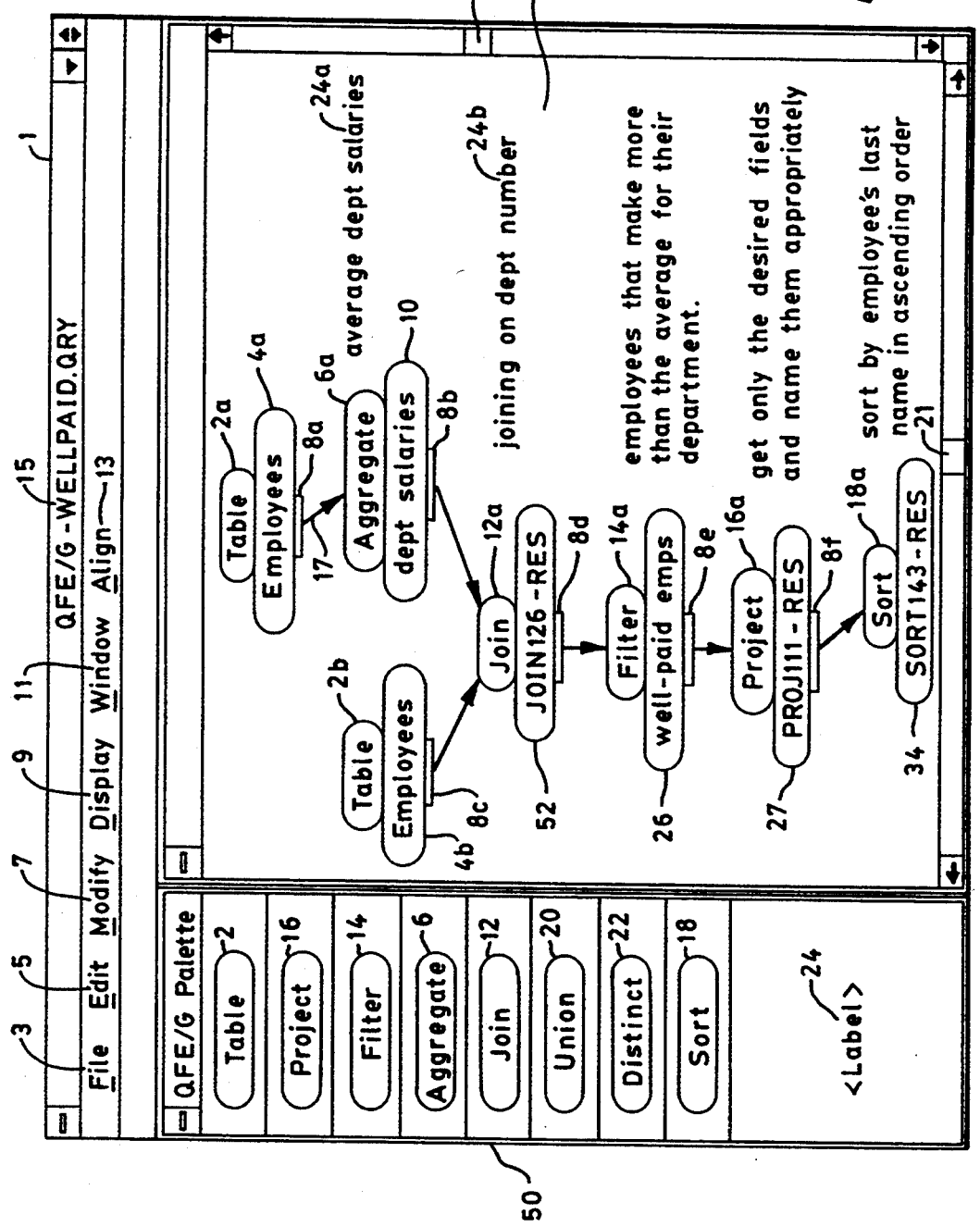
FIG. 2 shows a graphical display of an example Query.

Adding a comment via a label icon 24 allows the inclusion of descriptive information in the Query diagram. Labels 24a and 24b are shown in FIG. 2 on the right side of the screen 1a.

A number of pull-down menus are selected by clicking on their menu title. A File 3 menu, an Edit 5 menu, a Window 11 menu and an Align 13 menu are generally standard pull-down menus used in most windows applications. A Modify 7 menu and a Display 9 menu are designed especially for this Graphical Database application and are described in conjunction with FIGS. 1a and 1b respectively. Scrolling bars 19 and 21 perform their normal functions.

Figure 1A:
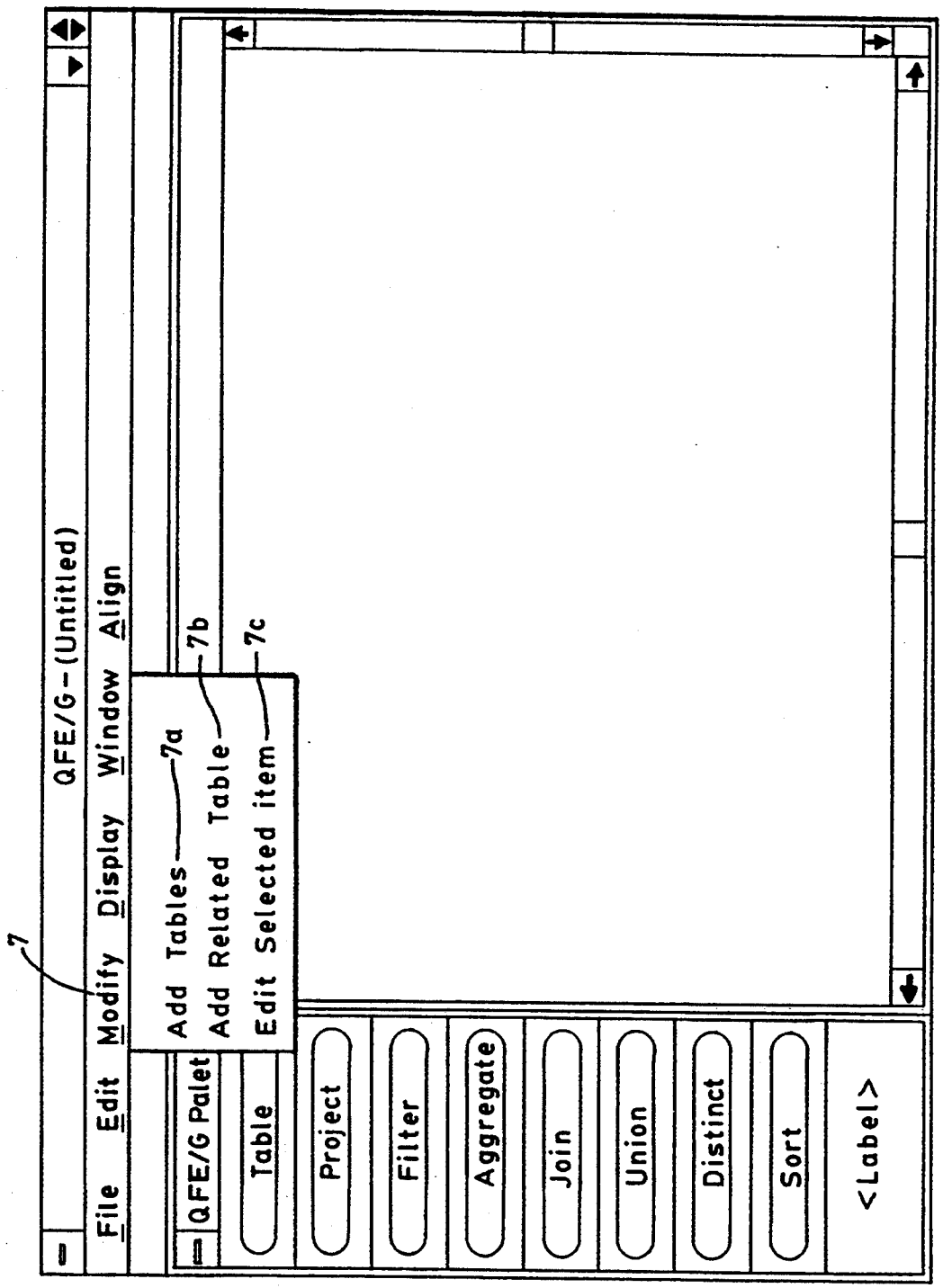

Referring to FIG. 1a, the Modify 7 menu includes an Add Tables 7a command, an Add Related Table 7b command and an Edit Selected Item 7c command. The Add Tables 7a command brings up a list of source tables (box 2-6 in the Add Tables dialog box 2-2 of FIG. 3), to select one or more tables from the database for inclusion in the Query diagram of FIG. 2.

The Add Related Table 7b command brings up a list of base tables in a dialog box, each of which has one or more "relationships" with the node selected prior to invoking the dialog. Relationships are defined between base tables in the data dictionary as part of a database; nodes in the diagram may also have these relationships by inheriting them from base tables. No dialog box example is described.

The Edit Selected Item 7c command is used with all the operator nodes that are shown in FIG. 2 to produce the dialogs shown in the remaining figures.

Figure 1B:
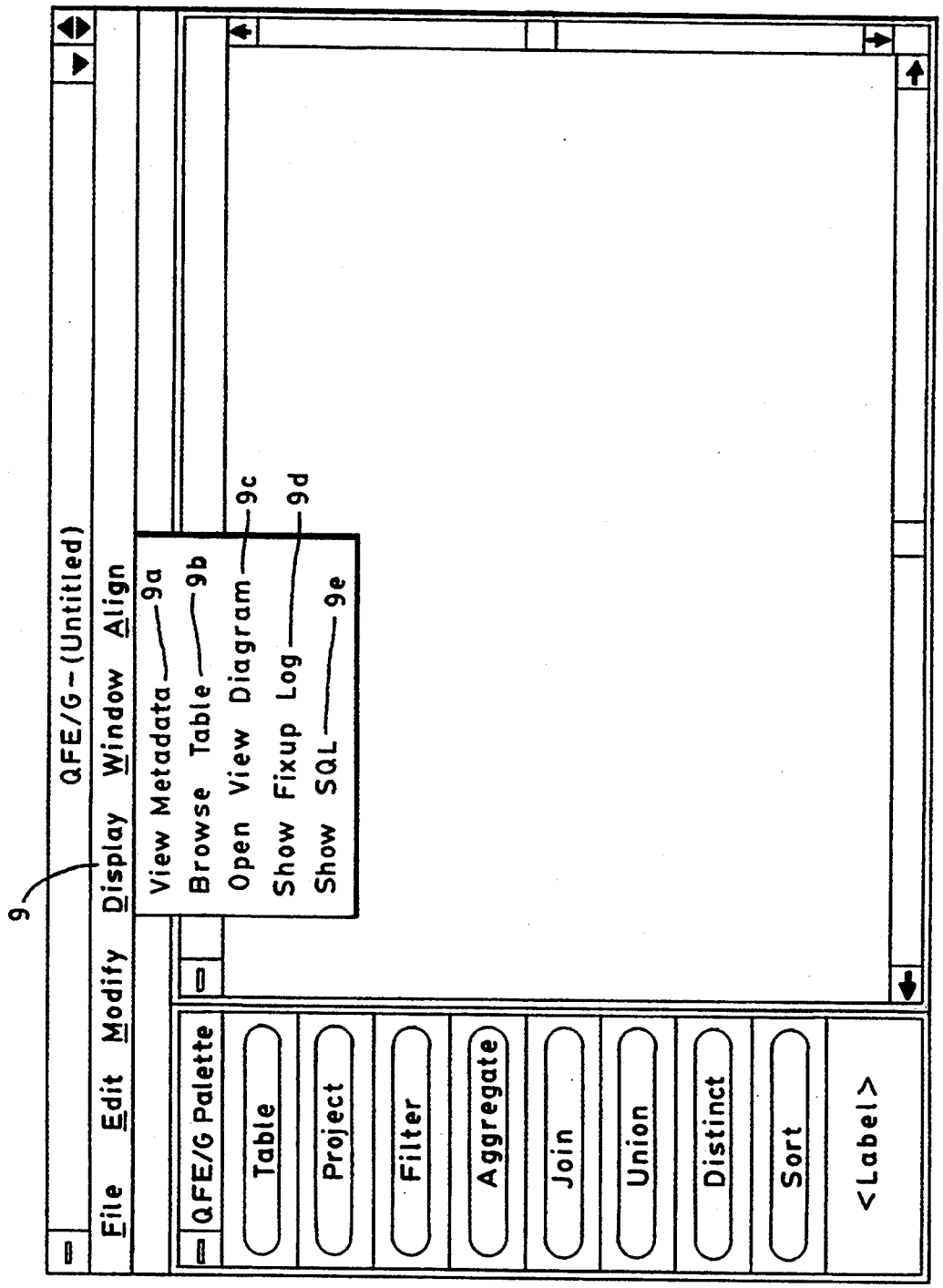
Figure 9:
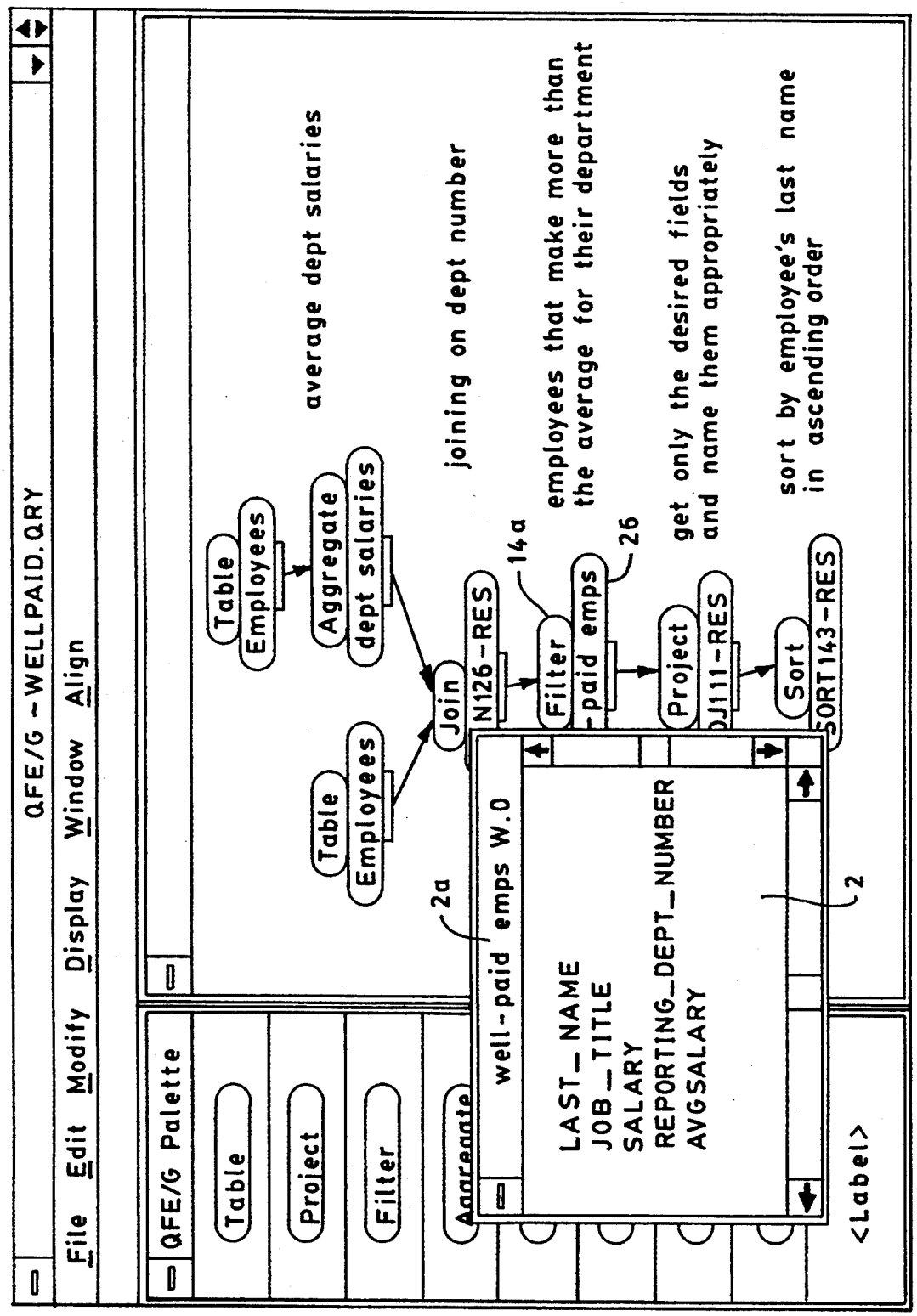
FIG. 9 shows the Well Paid Employees metadata window.

Referring to FIG. 1b, the Display 9 menu, includes a View Metadata 9a command, a Browse Table 9b command, an Open View Diagram 9c command, a Show Fixup Log 9d command, and a Show SQL 9e command. After clicking on the node "well-paid emps" 14a of FIG. 2, choosing the View Metadata 9a command produces the window 2 of FIG. 9 showing the names of the columns of the "well-paid emps" 14a table. Metadata defines the data (e.g. name, age, . . . ).

Selecting the Browse Table 9b command calls for the execution of the Query for one selected table and displays the resulting data. The Open View Diagram 9c command opens a Query, previously stored in the Data Dictionary 32-3 of FIG. 12. The Show Fixup Log 9d command brings up a fixup window which displays any changes that the application has made to the diagram as a result of a user action.

Selecting the Show SQL 9e command displays the SQL text that corresponds to a selected node in the Query diagram. Any node that is considered a valid node can be translated to SQL and displayed in the Show SQL dialog box 34-2 as seen in FIG. 10.

The advantages of this invention are best demonstrated by an example which depicts a Query which requests a result table of employees whose salary is greater than the average salary for their department.

Referring to FIG. 2, as shown in title box 15, a file entitled WELLPAID.QRY is developed as an example to disclose the invention. All of the nodes in the Query diagram in window 1a (except the Sort node 18a) contain three components: the functional part of the node, which is either a table or an operator icon (e.g. the Table icon 2a and the Filter icon 14a); the name of the node, which may be a default provided by the application (e.g. "PROJ111-RES" 27) or user supplied ("dept salaries" 10); and an output icon (e.g. 8a) which is used to connect to another node.

For this example, the user clicks on the Add Tables 7a command from the Modify 7 menu to bring up a list of tables. Employees table 4-2 is selected and the user clicks at a location in screen 1a where the new Table node 2a with name Employees 4a is placed. The Table node 2a is then copied via the standard Copy command from the Edit 5 menu to produce the Table node 2b with name Employees 4b and a connector 8c.

The user selects the Aggregate 6 icon from palette 50 and places it on screen 1a as Aggregate node 6a. Connector 8a is automatically connected to Aggregate node 6a. The connection may also be made by dragging a line from connector 8a over path 17.

Figure 4:
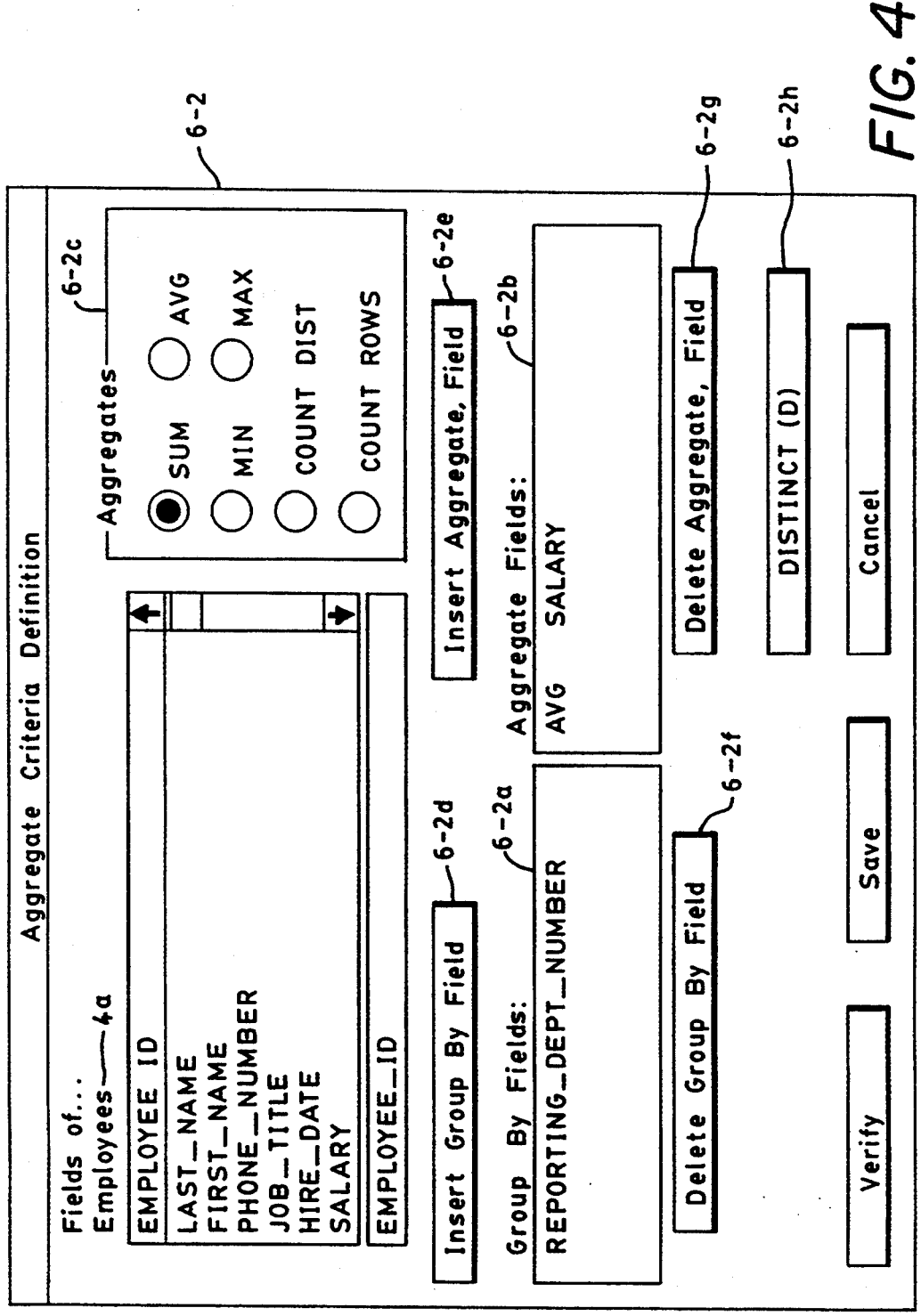
FIG. 4 shows the Aggregate Criteria dialog box.

Selecting the Edit Selected Item 7c command from the Modify 7 menu allows the selection of Employees Average Salary by Department, referenced as dept salaries 10. This is shown in FIG. 4.

Join node 12a is placed on screen 1a using a palette icon in a similar manner as described for the Aggregate node 6a and connected to connectors 8b and 8c. Selecting the Edit Selected Item 7c command from the Modify 7 menu allows the generation of a table of Employees and Average Salary by Department Number entitled JOIN126-RES 52 as shown in FIG. 5.

Filter node 14a receives the table designated JOIN126-RES 52 from connector 8d. Again selecting the Edit Selected Item 7c command allows the generation of a new table which contains a list of all Employees having a salary greater than the average salary as shown in FIG. 6. This table is designated as well-paid emps 26.

Figure 7:
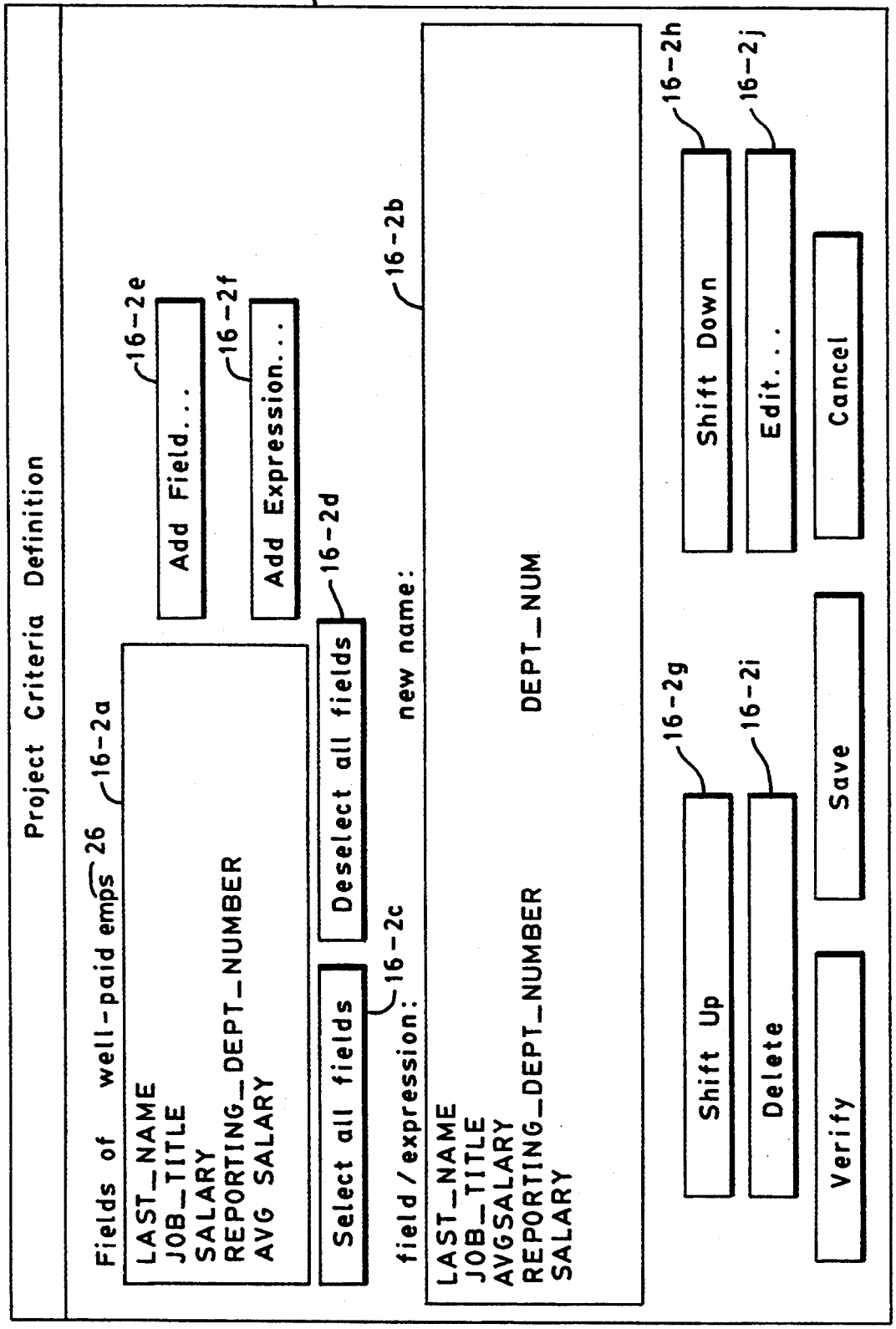
FIG. 7 shows the Project Criteria Definition dialog box.

Project node 16a receives the well-paid emps 26 table from connector 8e. Selecting the Edit Selected Item 7c command allows the determination of the columns and column names which are in the list designated PROJ111-RES 27, as shown in FIG. 7, which is the response to the Query.

Figure 8:
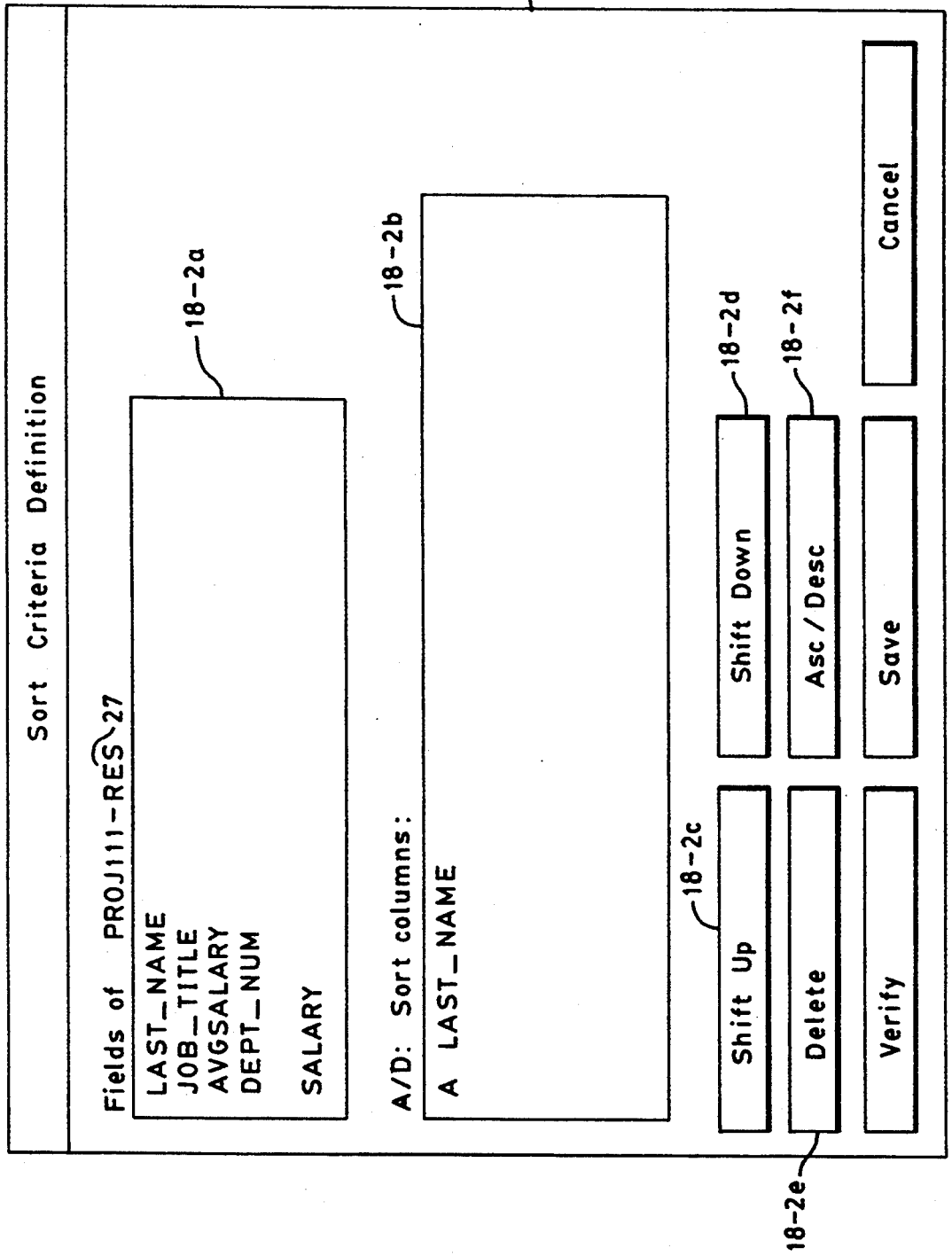
FIG. 8 shows the Sort Criteria Definition dialog box.

The Sort node 18a receives the PROJ111-RES 27 list from connector 8f to sort the rows as designated in FIG. 8.

Figure 3:
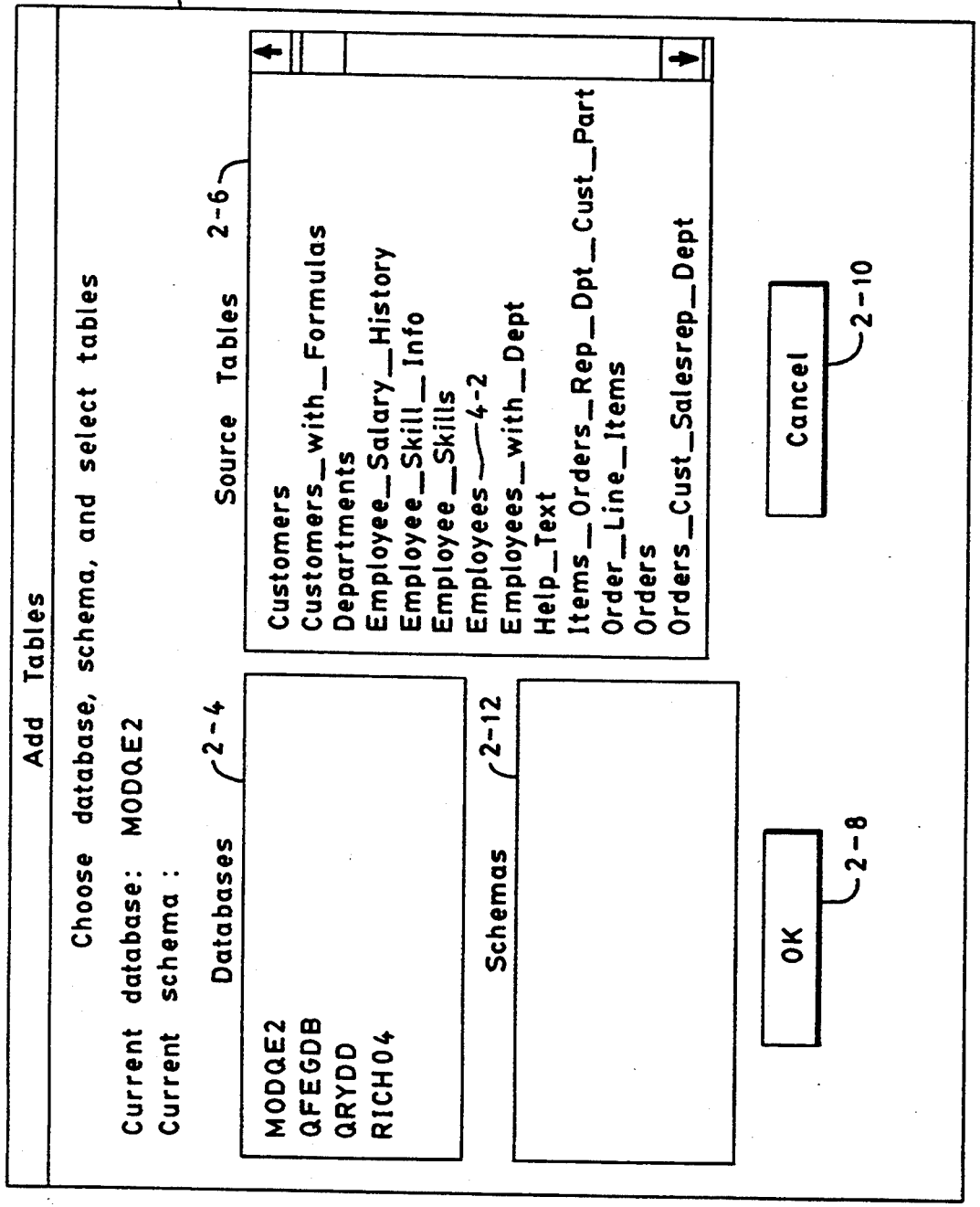
FIG. 3 shows the Add Tables dialog box.

Referring to FIG. 3, selecting the Add Tables 7a command brings up an Add Tables dialog box 2-2. Displayed are a list of Databases 2-4, a list of Source tables 2-6 from a previously selected database MODQE2 and a schemas list 2-12. Buttons OK 2-8 and Cancel 2-10 are conventional in operation. Employees Table 4-2 is selected, the OK button 2-8 is selected and as described above, the user selects a location in screen 1a where the new Table node 2a with the name "Employees" is placed. The schemas list 2-12 would contain a list of parts of a database. Any number of Source Tables 2-6 may be selected at this time and placed on screen 1a.

Referring to FIG. 4, selecting the aggregate node 6a of FIG. 2 and then selecting the Edit Selected Item 7c command brings up an Aggregate Criteria Definition dialog box 6-2 which lists the column names of the input table 2a (having the name Employees 4a) of FIG. 2. In FIG. 4, the Employees Table is grouped by Department Number (REPORTING_DEPT_NUMBER) as shown in a Group By Fields box 6-2a. An Aggregate Fields box 6-2b calls for the Average Salary. The result is a table containing two columns, department numbers and the average salary for each department.

Buttons in the Aggregates dialog box 6-2c determine aggregate values. Clicking on the Insert and Delete buttons 6-2d through 6-2g perform the named function for the information in the respective boxes 6-2a and 6-2b. A Distinct button 6-2h is selected to delete duplicates when computing results. Verify, Save and Cancel perform standard functions.

Referring to FIG. 5, selecting the Join node 12a of FIG. 2 and then clicking on the Edit Selected Item 7c command displays a Join Criteria Definition dialog box 12-2. Box 12-2a lists the column names of the input table 2b (with name Employees 4b). Box 12-2b lists the column names of the other input, the aggregate node 6a (with name "dept salaries" 10). Box 12-2c gives a boolean expression (i.e. predicate) based upon the common columns of the two inputs. This predicate is used to filter out rows of the Cartesian product of the two input tables. Boxes 12-2d and 12-2e provide the symbols and text to more easily define such a predicate. The button 12-2f may be used to bring up another dialog box (not shown) containing a list of predicates based upon relationships between the input tables, from which the user may choose one or more for the criteria of the join. When a join operator is added to a query, the system fills the predicate box with a predicate based on a relationship, if any are found.

Referring to FIG. 6, selecting the Filter node 14a of FIG. 2 and then choosing the Edit Selected Item 7c command displays a Filter Criteria Definition dialog box 14-2. The Filter 14a gets rid of rows that do not meet the condition given in box 14-2b, "SALARY->AVGSALARY." Box 14-2a again lists the input column names for use in defining the criteria. A Select All Fields button 14-2c and a Deselect All Fields button 14-2d are quick ways to get to all columns of the input table.

Some of the columns may have coded values. A Pick Value button 14-2e is a quick way of getting at these values. No dialog example is included. The output table lists all employees making more than the average department salary. Boxes 14-2f and 14-2g provide the symbols and text to more easily prepare the filter predicate 14-2b.

Referring to FIG. 7, selecting the Project node 16a of FIG. 2 and then choosing the Edit Selected Item 7c command brings up a Project Criteria Definition dialog box 16-2. The Project node 16a keeps only desired columns in the result and renames some of them for convenience.

Box 16-2a lists the input columns from the Filter node 14a (with name "well-paid emps" 26) of FIG. 2. Box 16-2b lists the desired columns in the output table. A Select All Fields button 16-2c and a Deselect All Fields button 16-2d are quick ways to get to all columns of the input table. An Add Field button 16-2e allows the addition of an undefined column. An Add Expression button 16-2f allows the addition of an expression or constant (known as a "virtual field"). A Shift Up button 16-2g, a Shift Down button 16-2h, a Delete button 16-2i and an Edit button 16-2j are used to manipulate selected columns and names from box 16-2b. The Verify, Save and Cancel buttons perform standard functions.

A Sort operation sorts the rows of the result so far. A Sort Criteria Definition dialog box 18-2 is displayed in FIG. 8. Box 18-2a lists the output fields of the Project node 16a (with name "PROJ111-RES" 27). Box 18-2b lists the columns by which the data should be sorted. In this case the sort is on LAST_NAME in ascending order. A Shift Up button 18-2c, a Shift Down button 18-2d, a Delete button 18-2e, and an Ascending/Descending button 18-2f are used to manipulate the sort column names in box 18-2b. The sort node 18a has no output icon, thus it may not be used as input to another node. This is only true for sort nodes.

Referring to FIG. 9, selecting the Filter node 14a (with name "well-paid emps" 26) in FIG. 2 and selecting the View Metadata 9a command displays the metadata window 2 with title "well-paid emps W.0" 2a. Selecting any node of FIG. 2 and the View Metadata 9a command is a convenient way to show the columns available out of any node; that is, the history of the Query is available at any time during or after the Query is completed.

Referring to FIG. 10, clicking on the Sort node 18a (with name "SORT143-RES" 34) from FIG. 2 and choosing the Show SQL 9e command displays the Show SQL dialog box 34-2. Box 34-2a shows the SQL translation of the Query that is represented by the Sort node 18a in FIG. 2.

Figure 11:
FIG. 11 shows the Query result.

Referring to FIG. 11, the Query result is displayed by selecting the SORT143-RES node 18a and the Browse Table 9b command and is shown in the dialog box 11-9. Selecting a node in FIG. 2 and the Browse Table 9b command displays the data represented by that node in the dialog.

Referring to FIG. 2, the application is put in a text mode by clicking on the Label 24a in window 1a. The application is also put into text mode if any of the names of the nodes in FIG. 2 are selected. While in text mode, the user may modify the text of the selected label or name. Each node may be given a descriptive label that moves with the node, as opposed to general diagram comments, which are independent entities. Both of these provide a help to the user during the generation of the Query and for future maintenance.

Also, the nodes of the Graphical Query Front End are all manipulable, graphical entities. Each of the nodes that are displayed in screen 1a, the tables, the operator nodes and the labels can be moved around the diagram. The connections between the nodes follow.

When nodes are brought into the Query diagram, they are automatically connected to any selected input(s) as long as the connections are valid. The user can also connect these nodes manually, if so desired, or actually delete and reconnect them, and can also move the connectors around. The diagram can be panned, so that more nodes may be included than are currently shown. The scroll bars 19 and 21 on the right and on the bottom can be used to move through what is displayable.

Figure 12:
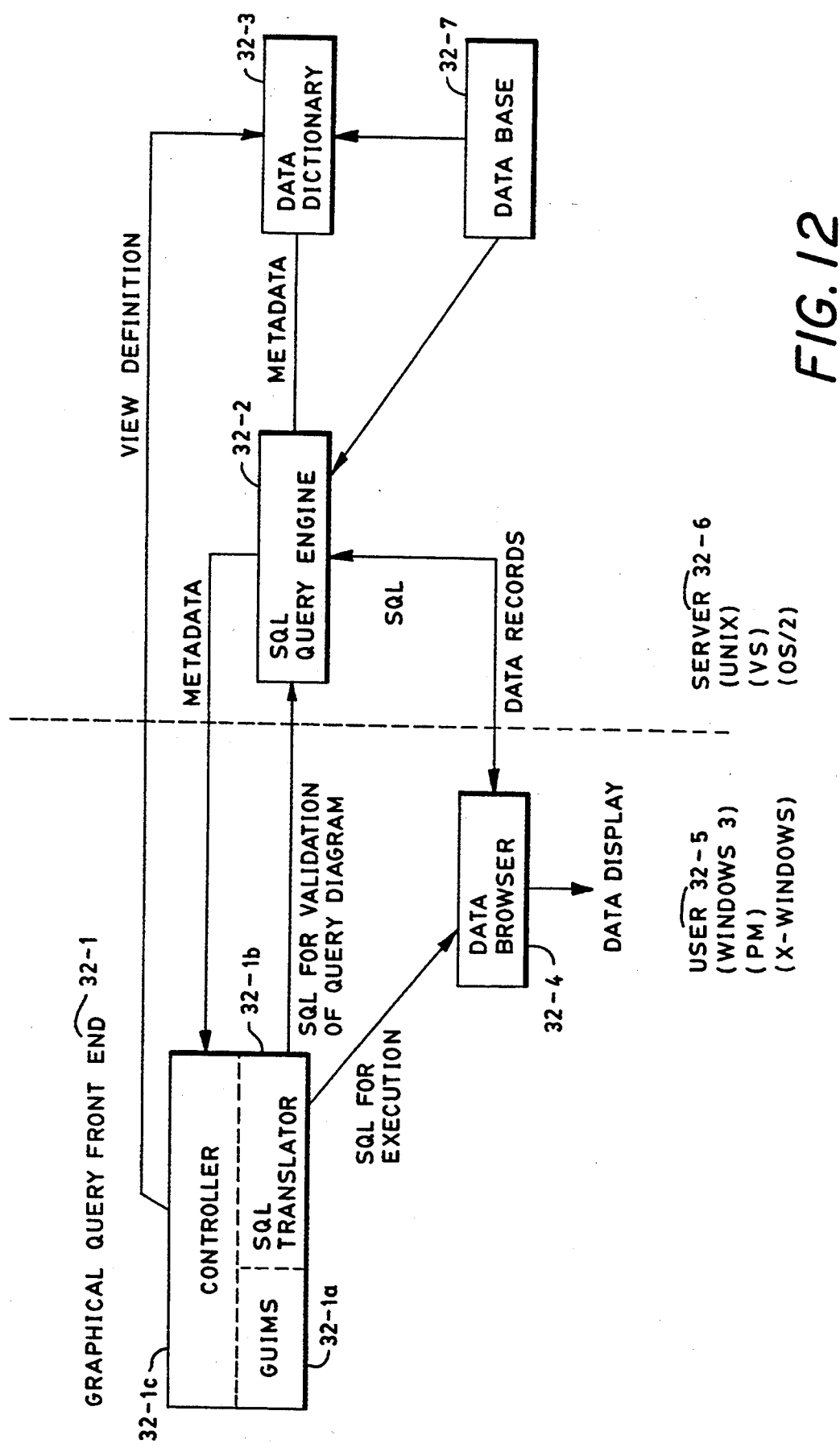
FIG. 12 is an Architectural Overview of the Graphical Query Front End System.

FIG. 12 shows a block diagram of the Graphical Query Front End (QFE/G) architecture. The relational Database Management System (DBMS) is split into two parts, the part which is controlled by a User 32-5 through typically Microsoft Windows 3, IBM Presentation Manager software or X-windows software running under UNIX; and the part which operates under a Server 32-6, typically UNIX, Wang VS or OS/2.

The User 32-5 part includes a Graphical Query Front End 32-1 which has 3 sections, a Controller 32-1c, a Graphical User Interface Management System (GUIMS) 32-1a and an SQL Translator 32-1b. The GUIMS 32-1a displays all of the icons in the Palette 50 and all of the nodes of FIG. 2. The SQL Translator 32-1b translates the current query diagram into an SQL statement. The Controller 32-1c communicates with the GUIMS 32-1a to give the location on screen 1a of the various nodes and the connections between the nodes. The Controller 32-1c also communicates with the SQL Translator 32-1b to translate parts of the diagram to SQL or to request metadata from an SQL Query Engine 32-2. The Controller generally verifies the operation of the Query. The User 32-5 side also includes a Data Browser 32-4 which is used for displaying records that are the results of a Query or records at any node during the preparation of the Query.

The components on the server 32-6 side are the SQL Query Engine 32-2 and the Data Dictionary 32-3. The database is stored on a disk 32-7 and is accessed by the SQL Query Engine 322. The Data Dictionary 32-3 contains the information which describes the database and is used to describe or build Queries as well as other pieces of a database.

During the design of the Query as shown in FIG. 2, the SQL Translator 32-1b translates the query represented by a node to an SQL statement and sends it to the SQL Query Engine 32-2 for validation. The Controller 32-1c tells the GUIMS 32-1a to color the node of the FIG. 2 white for a valid SQL statement and gray for an invalid SQL statement.

The Engine 32-2 also sends metadata to the QFE/G 32-1 to enable the user to build portions of FIG. 2 when requested by QFE/G 32-1. The Engine 32-2 receives this information from the Data Dictionary 32-3. When the user requests the results of a Query, the SQL Translator 32-16 translates the selected node in FIG. 2 to an SQL statement and sends it to the Data Browser 324. The Data Browser 32-4 then passes the SQL statement to the SQL Query Engine 32-2, which executes the query and returns the data records to the Data Browser 32-4 which then displays the data as in FIG. 11.

The user may decide to store a Query as if it were a table in the Data Dictionary 32-3 to be accessed later like any other table. To do so, the Controller 32-1c requests the Data Dictionary 32-3 to store the Query for later access.

While the invention has been shown and described with reference to the preferred embodiment thereof, it will be understood by those skilled in the art that the above and other changes in form and detail may be made therein without departing from the spirit and scope of the invention.

We claim:

1. A method for graphically composing on a computer system a query of a preexisting independent relational database including a plurality of source tables, comprising steps of:

constructing a graphically displayed network of interconnected nodes generically representing source tables and relational query operators, respectively, in response to input from a user, each table node including an output icon representing contents of said represented source table, and each operator node including an output icon representing a table containing the result of said represented relational query operator; and automatically generating a query corresponding to a designated node in the network.

2. The method of claim 1, wherein said constructing step comprises steps of:

displaying a palette of icons including an icon generically representing a source table, and a plurality of other icons generically representing respective relational query operators;

selecting one of said icons in response to input from a user;

displaying a copy of said icon as a new node in said network; and interconnecting said new node to other nodes in said network in response to input from said user.

3. The method of claim 2, wherein said constructing step further comprises steps of:

selecting a node in said network, in response to input from said user; and associating criteria with said selected node in response to input from said user.

4. The method of claim 3, wherein said associating step includes the steps of:

displaying a request for criteria for said selected node;

accepting information representing said criteria from said user in response to said displayed request; and associating said criteria representative information with said selected node.

5. The method of claim 4, wherein if said selected node is a generic source table representative node, said step of displaying a request comprises the step of displaying a listing of names of said plurality of source tables in a dialog box.

6. The method of claim 4, wherein if said selected node is a generic relational query operator representative node, said step of displaying a request comprises the step of displaying a dialog box requesting parameters relating to said the relational query operator represented by said selected node.

7. The method of claim 2, wherein if said selected icon is said generic source table representative icon, said step of displaying a copy of said icon comprises the step of displaying a generic source table representative node including said output icon representing contents of the source table represented by that node.

8. The method of claim 2, wherein if said selected icon is one of said plurality of other icons generically representing respective relational query operators, said step of displaying a copy of said icon comprises the step of displaying a relational query operator representative node including an input terminal representing an input table to be operated upon, and said output icon representing an output table containing the result of performing the relational query operation represented by said node on the input table to said node.

9. The method of claim 2, wherein if said selected icon is one of a subset of said plurality of other icons generically representing respective relational query operator, said step of displaying a copy of said icon comprises the step of displaying a relational query operator representative node including a first and a second input terminal representing respective input tables to be operated upon, and an output icon representing an output table containing the result of performing the relational query operator represented by said node on the respective input tables to said node.

10. The method of claim 2, wherein:

one of said plurality of other icons generically representing respective relational query operators represents a sort operation; and if said selected icon is said sort operation representative icon, said step of displaying a copy of said icon comprises a step of displaying a sort operation representative node including an input terminal representing an input table to be sorted.

11. The method of any one of claims 7, 8, 9 and 10 wherein said interconnecting step comprises the steps of:

specifying an output terminal of one of said nodes in said network in response to input from said user;

specifying in input terminal of a different one of said nodes in said network in response to input from said user; and interconnecting said specified output terminal to said specified input terminal.

12. The method of claim 2, wherein said step of selecting one of said icons comprises steps of:

displaying a menu including choices of available icons for said network; and accepting information from said user representing a desired icon.

13. The method of claim 12, wherein one of said choices is to add a generic source table representative node to said network.

14. The method of claim 3, wherein predetermined pairs of said plurality of source tables are related, and said step of selecting one of said icons comprises steps of:

selecting a node in said network, in response to input from said user;

displaying a menu including choices of available icons for said network, wherein one of said choices is to add a generic source table representative node to said network which is related to said selected node; and accepting information from said user representing a desired icon.

15. The method of claim 1, comprising further steps of:

specifying a node in said network in response to input from a user;

selecting from a menu a desired type of information related to said specified node in response to input from said user; and displaying said desired type of information.

16. The method of claim 15, wherein said step of selecting a desired type of information comprises steps of:

displaying said menu including choices of available information related to said selected node; and accepting information from said user representing said desired type of information.

17. The method of claim 15, wherein a desired type of information includes metadata describing the structure of the data resulting from operation of said selected node.

18. The method of claim 15, wherein a desired type of information includes said generated query corresponding to said selected node.

19. The method of claim 15, wherein a desired type of information includes a result of operation of said selected node.

20. The method of claim 1, wherein said step of constructing comprises a step of annotating said network in response to input from a user.

21. The method of claim 1, wherein said generating step generates said query in SQL.

22. Apparatus for graphically composing a query of a preexisting independent relational data base system, comprising:

means for storing data belonging in said data base system;

means, coupled to said data storing means and responsive to a query, for retrieving data stored in said data storing means, and generating a result of said query;

means for displaying said result of said query;

means, responsive to input from a user, for constructing a graphically displayed network of interconnected nodes generically representing source tables and relational query operators, respectively, each table node including an output icon representing contents of said represented source table, and each operator node including an output icon representing a table containing the result of said represented relational query operator; and means, responsive to said network constructing means, for automatically generating said query corresponding to a designated node in the network.

23. The apparatus of claim 22, wherein: said data storing means comprises means for storing information representing the structure of said data.

* * * * *